(12) United States Patent
Lai

(10) Patent No.: US 7,548,419 B1
(45) Date of Patent: Jun. 16, 2009

(54) ELECTRONIC DEVICE WITH SWITCH MODULE

(75) Inventor: Chien-Hua Lai, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 12/034,867

(22) Filed: Feb. 21, 2008

(51) Int. Cl.
*G06F 1/16* (2006.01)
(52) U.S. Cl. .................. 361/679.43; 89/33.4; 439/188; 347/54
(58) Field of Classification Search .................. 347/54, 347/56, 61–62; 348/222.1, 374; 360/96.3, 360/99.06; 702/161; 439/160, 188, 701, 439/717; 89/33.4; 361/679.01–679.02, 679.27, 361/679.43, 679.58
See application file for complete search history.

(56) References Cited

U.S. PATENT DOCUMENTS 6,851,985 B2 * 2/2005 Lafragette et al. .......... 439/701
7,389,605 B1 * 6/2008 Clark ........................... 42/98
7,442,059 B2 * 10/2008 Oila ........................... 439/160

\* cited by examiner

*Primary Examiner*—Hung V Duong
(74) *Attorney, Agent, or Firm*—Morris, Manning & Martin LLP; Tim Tingkang Xia, Esq.

(57) ABSTRACT

An electronic device with switch module includes a first body and a second body which pivot together to be closed. The first body has a buckling member. The second body has a catching member, an actuating member, an ejecting member, and a through hole disposed correspondingly. When the first body is closed on the second body, the buckling member passes through the through hole, presses in the ejecting member, and is caught by the catching member, so as to maintain a closed state of the first and the second bodies. When the actuating member is actuated, the actuating member pushes the catching member to release the buckling member and the ejecting member pushes the buckling member out of the through hole, such that a gap is formed between the first and the second bodies.

15 Claims, 14 Drawing Sheets

ELECTRONIC DEVICE WITH SWITCH MODULE

BACKGROUND OF THE INVENTION

1. Field of Invention

The present invention relates to an electronic device. More particularly, the present invention relates to an electronic device with switch module.

2. Related Art

With development of information industry and requirements of mobile businessmen, conventional ponderous desktop computers have a trend of being increasingly replaced by light and thin portable computers. Recently, the most popular portable computer on market is notebook having advantages of portability such as small volume and light weight, and having excellent operation performance. Entire structure of the common notebook available in the market mostly has a host accommodating a motherboard, output and input devices, and major electronic parts, and an upper lid with a liquid crystal display (LCD) and other fittings installed thereon. The upper lid is often pivoted on a side of the top of the host of the notebook, and can be selectively opened to a suitable viewing angle or closed on a keyboard of the host. Therefore, a corresponding switch component must be disposed between the upper lid and the host, in which the switch component is used to fix the upper lid closed on the host, so as to prevent the expensive LCD from being damaged by collision because of the upper lid swings relative to the host when carrying the notebook.

The switch component is mostly a slideable hook member, in which the hook member can be pushed to horizontally shift left and right relative to the upper lid. A pushing sheet exposing from end edge of the upper lid is connected to an end of the hook member, and a spring is disposed on the other end. A buckling slot corresponding to the hook member is opened in a top surface of the host, and when a user closes the upper lid on the host, the hook member is pushed by an edge of the buckling slot to be buckled in the host, and the upper case is normally buckled above the host through the spring. When the user intends to open the upper lid, it is only necessary to push the pushing sheet at the end edge of the upper lid to shift the hook member, and the hook member exits from the host through the buckling slot, such that the user can open the upper lid. However, the main body of the hook member and the spring are disposed on the upper lid of the notebook, and the hook member is further required to slide in the upper lid, so it is necessary for the upper lid to leave a space for accommodating the hook member and the spring, which occupies a large space in the upper lid. In addition, the buckling slot must be opened in the top surface of the host, when the upper lid is opened, the buckling slot makes the top surface of the host has a notch, not only appearance aesthetic sense of the host is seriously affected, but also dust or extraneous material are easily accumulated. If the extraneous material falls into the buckling slot, it is possible to block channel through which the hook member enters into the buckling slot, such that it is impossible to close the upper lid.

SUMMARY OF THE INVENTION

In the prior art, the hook member used to buckle the upper lid of the notebook occupies too much space in the upper lid, and the buckling slot on the top surface of the host providing for holding the hook member seriously affects the appearance aesthetic sense of the host. In view of the above problems, the present invention is mainly directed to provide an electronic device with switch module, so as to save inner space of the upper lid of the notebook and to improve the appearance aesthetic sense of the notebook.

In order to achieve the above objective, the present invention provides an electronic device with switch module, which includes a first body (for example but not limited to the upper lid of the notebook computer) and a second body (for example but not limited to the host of the notebook computer). The first body has at least one buckling member, in which the first body can be but is not limited to the upper lid for installing the display in the notebook. The second body is pivoted to the first body to be closed with the first body by pivoting, that is, the first body can be covered on the second body by turning relative to the second body, in which the second body can be but is not limited to the host for carrying a keyboard, a motherboard, and other electronic parts.

The second body has at least one through hole corresponding to the buckling member, so as to accommodate the buckling member when the first body is closed on the second body. The second body further includes a catching member, a first elastic member, an actuating member, at least one ejecting member, and at least one second elastic member. The catching member is disposed in the second body and moves between a catching position and a releasing position, in which when the first body is closed on the second body, the catching member catches the buckling member of the first body at the catching position, such that the first body is fixed on the second body. The first elastic member is disposed on a side of the catching member, and normally pushes the catching member towards the catching position. The actuating member is disposed on the second body, and the actuating member is actuated (for example pressed) to push the catching member to move to the releasing position, such that the catching member releases the first body. The ejecting member is disposed on a side of the through hole, and the ejecting member is pushed to shift between a retracting position and an ejecting position. When the first body is closed on the second body, the ejecting member is pushed by the buckling member to the retracting position. The second elastic member is disposed corresponding to the ejecting member and normally pushes the ejecting member towards the ejecting position, such that the ejecting member extends into the through hole at the ejecting position, and a top surface of the ejecting member and a top surface of a top plate are located on a same plane.

In the present invention, the components for buckling the first body (the upper lid of the notebook computer) are disposed on the second body (the host of the notebook computer), so as to effectively prevent too much inner space of the first body from being occupied. Next, the actuating member can be actuated to make the catching member release the buckling member, and to make the ejecting member push the buckling member out of the through hole, so it is helpful to open the first body by pivoting. Further, the top surface of the ejecting member is even with the surface of the through hole when the first body is opened, so as to maintain the completeness of the surface of the second body. Not only the appearance of the host of the notebook computer is made to have more aesthetic sense, but also the extraneous material is prevented from entering into the through hole to obstruct the closing of the upper lid.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to have a further understanding of the objective, the construction, the feature, and the function of the present invention, detailed description is given with embodiments as follows.

Figure 1A:
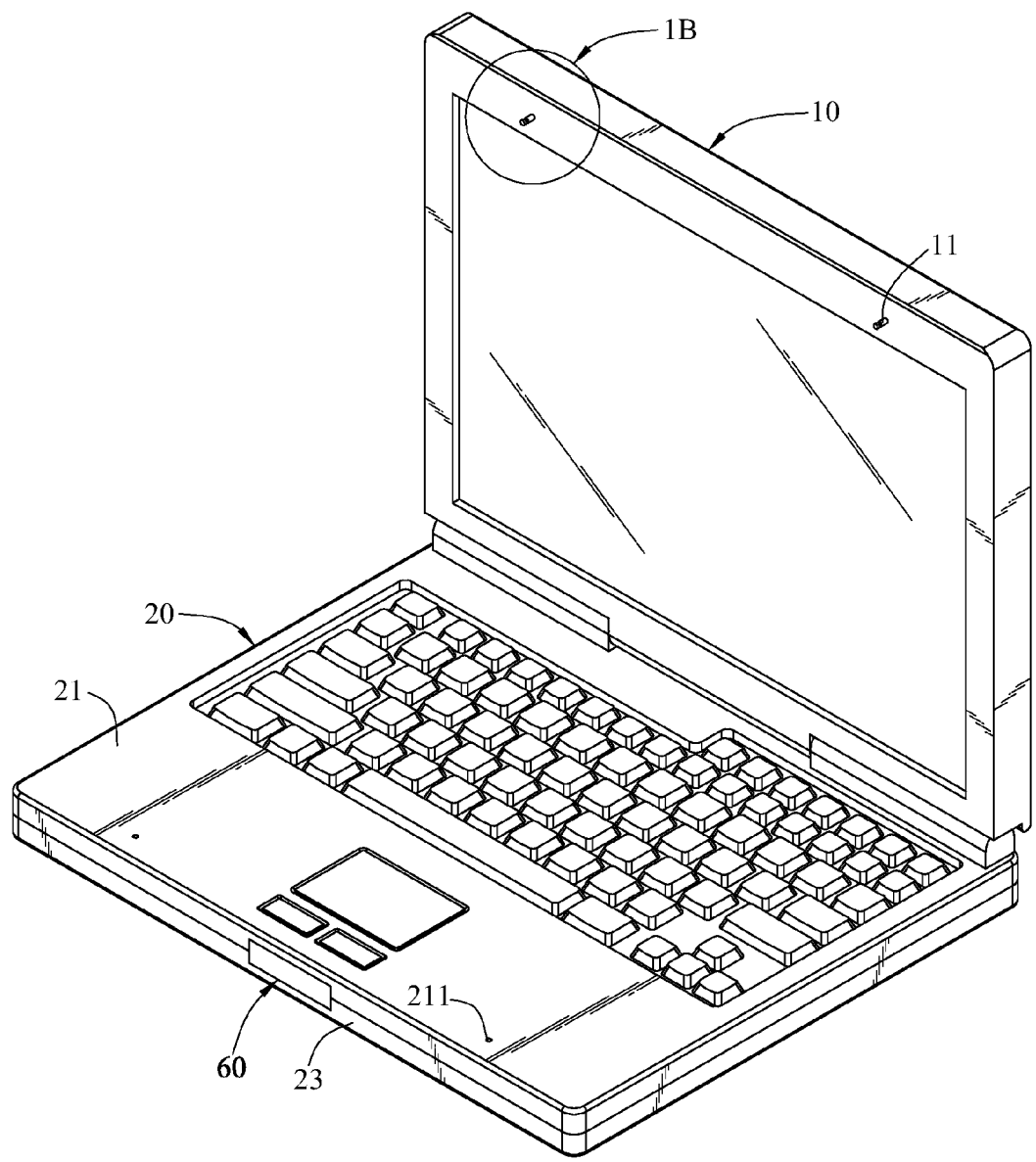
FIG. 1A is a schematic stereogram of an electronic device in the present invention.
Figure 1B:
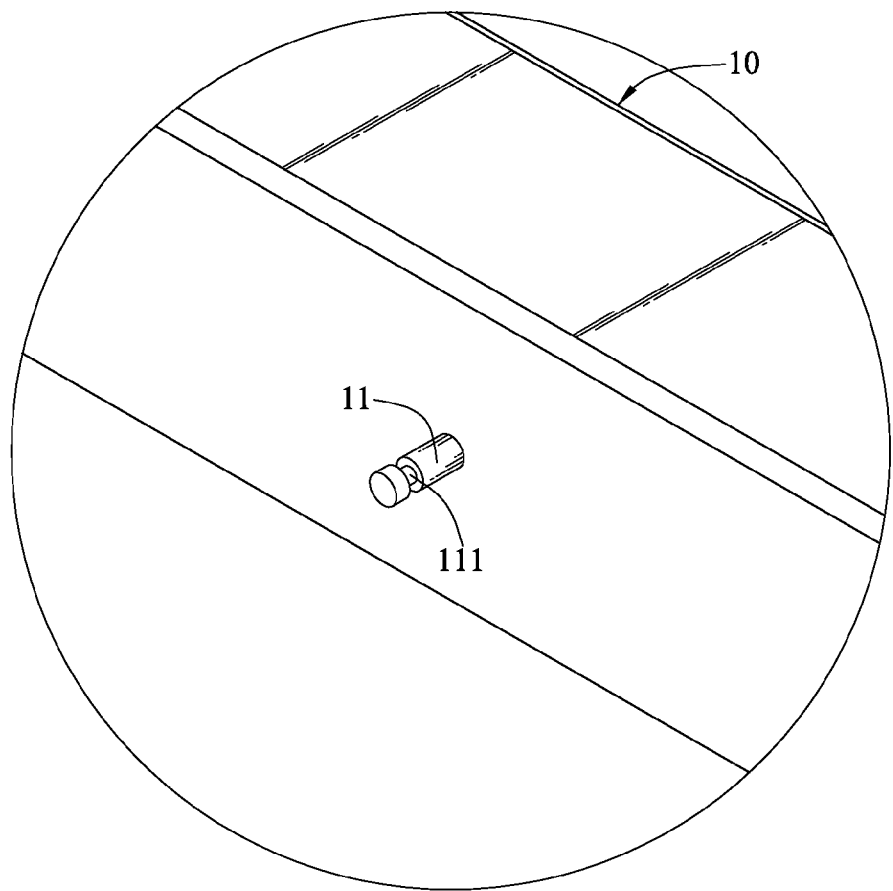
FIG. 1B is a partial schematic stereogram of a buckling member on the first body in FIG. 1A.
Figure 2A:
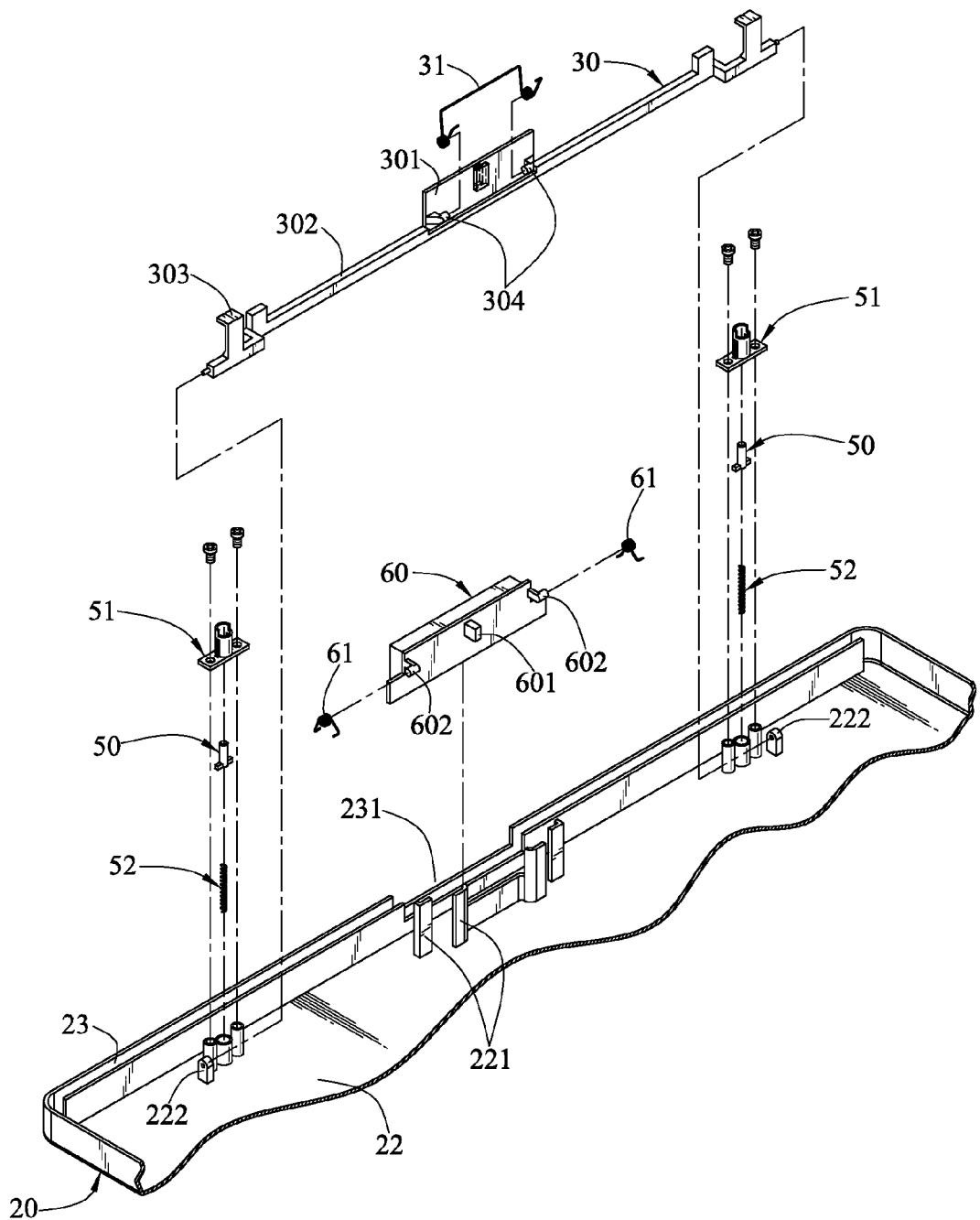
FIG. 2A is an exploded stereogram of the inner components of the second body in the present invention.

Referring to FIGS. 1A, 1B, and 2A, an electronic device with switch module provided by the present invention is shown. In the present invention, the electronic device with switch module includes a first body 10 and a second body 20, in which the electronic device can be but is not limited to a notebook.

Referring to FIGS. 1A and 1B, the first body 10 has two buckling members 11, and a recess 111 is disposed at a middle section of the buckling member 11. The first body 10 is pivoted to the second body 20, such that the first body 10 is closed on the second body 20 by pivoting, that is, the first body 10 can be covered on the second body 20 by turning relative to the second body 20. The first body 10 can be but is not limited to the upper lid for disposing the display in the notebook, and the quantity of the buckling members 11 is not limited to two and can also be increased or reduced according to practical demand, such that the first body 10 only has one buckling member 11 or has more than two buckling members 11.

Figure 2B:
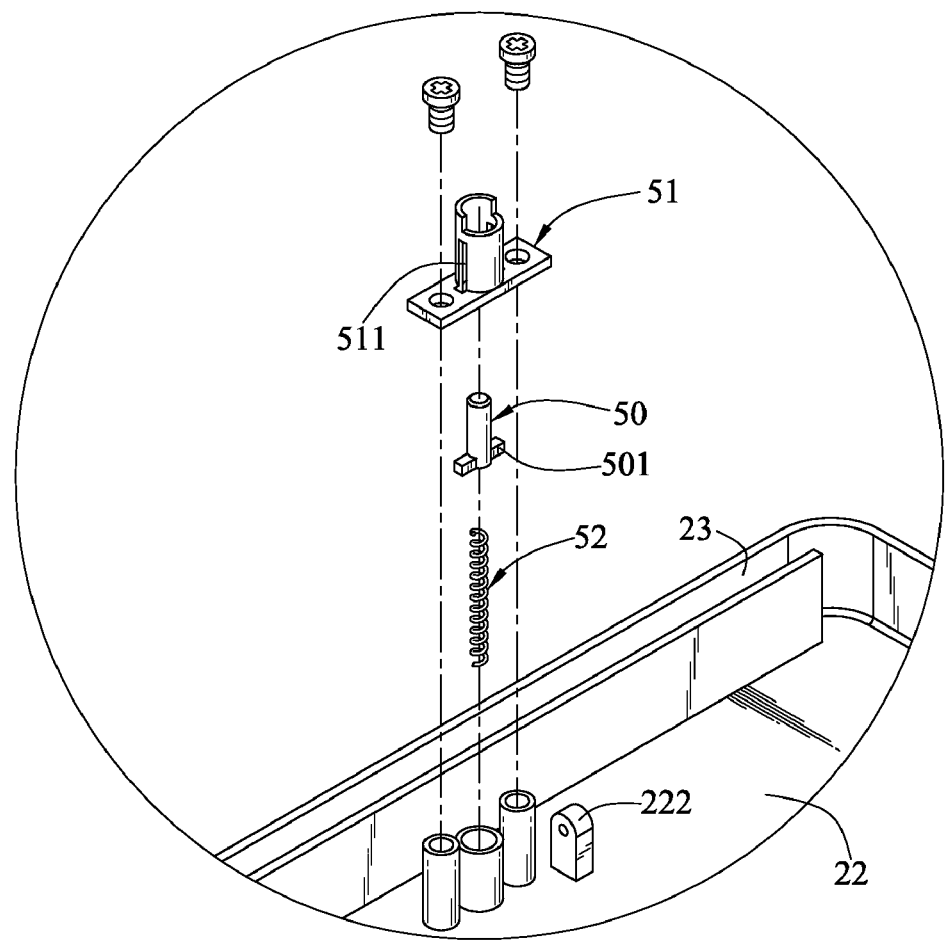
FIG. 2B is an exploded stereogram of the ejecting member, the limiting member, and the second elastic member in FIG. 2A.

Referring to FIGS. 1A, 2A, and 2B, the second body 20 is a hollow case composed of a top plate 21 facing the first body 10, a bottom plate 22 facing the top plate 21, and a side plate 23 connecting circumferences of the top plate 21 and the bottom plate 22. The second body 20 can be but is not limited to the host for accommodating a keyboard, a motherboard, or other electronic parts in the notebook, and the second body 20 includes a catching member 30, a first elastic member 31, two ejecting members 50, two limiting members 51, two second elastic members 52, an actuating member 60, and two third elastic members 61. A top surface of the top plate 21 faces the first body 10, and a bottom surface of the top plate 21 faces the bottom plate 22. The side plate 23 is connected to edges of the top plate 21 and the bottom plate 22, and has a notch 231. The second body 20 has two through holes 211 corresponding to the buckling members 11 respectively, in which the through holes 211 are opened on the top plate 21. Each through hole 211 penetrates the top plate 21 of the second body 20, so as to communicate the internal of the second body 20 with the external, thereby accommodating each buckling member 11 of the first body 10 when the first body 10 is closed on the second body 20. The number of the through hole 211 is increased or reduced according to the number of the buckling member 11, and it is not limited to the number as shown in the drawing. The bottom plate 22 has a plurality of supporting members 221 facing the side plate 12 and two bearing blocks 222 facing each other.

Figure 3A:
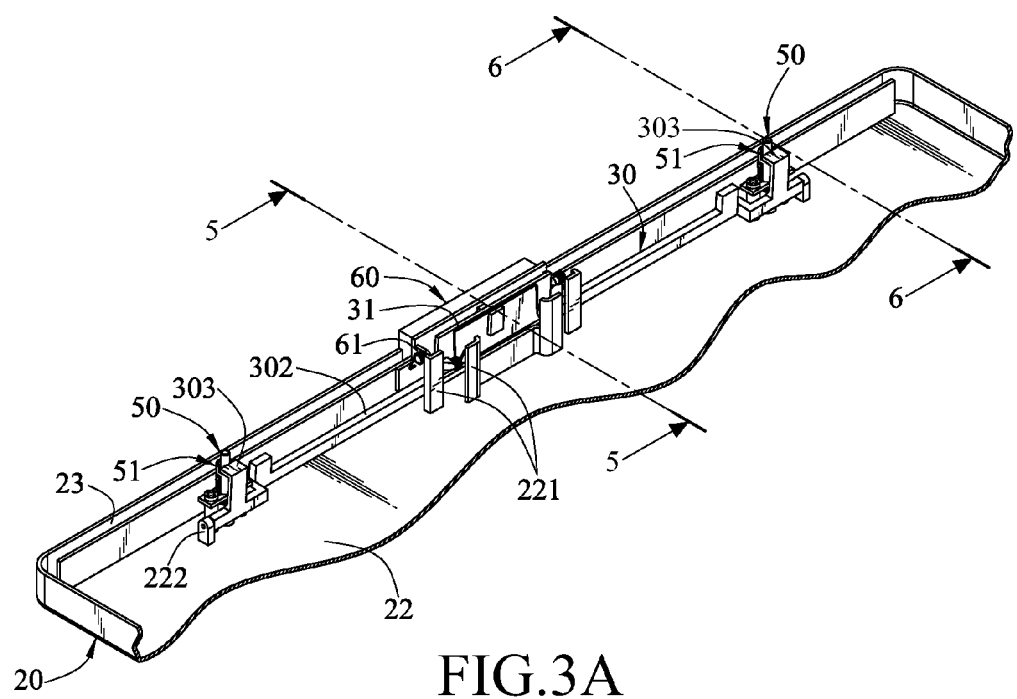
FIG. 3A is a schematic stereogram of the inner components of the second body in the present invention.
Figure 3B:
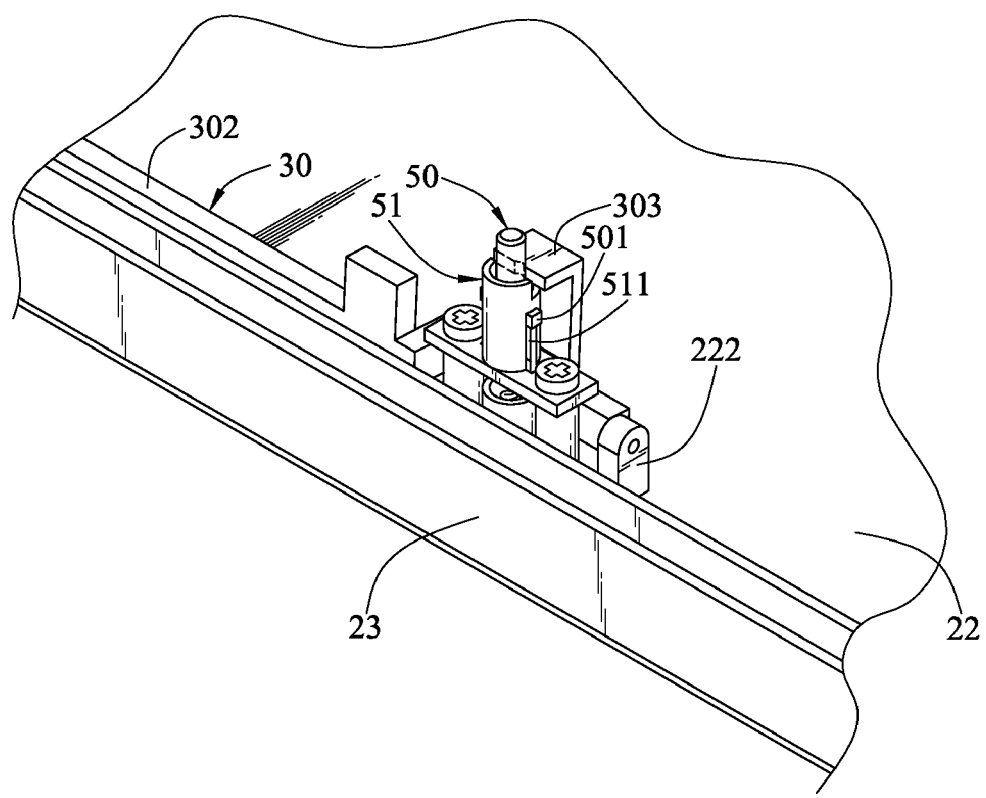
FIG. 3B is a partial schematic stereogram around the ejecting member and the limiting member in FIG. 3A.

Referring to FIGS. 2A, 2B, and 3A, the catching member 30 is disposed in the second body 20, and the catching member 30 includes a plate portion 301, two connecting portions 302, two hook portions 303, and two installing portions 304. Two ends of the catching member 30 are pivoted to the bearing blocks 222 of the bottom plate 22, such that the catching member 30 can be pushed to move relative to the second body 20 between a catching position and a releasing position. The catching member 30 is used to catch the buckling member 11 of the first body 10 at the catching position, and to release the buckling member 11 of the first body 10 at the releasing position. The plate portion 301 is located on the middle section of the catching member 30, disposed corresponding to the supporting members 221 of the bottom plate 22, and located between the side plate 23 and the supporting members 221. The connecting portions 302 are respectively located on two sides of the plate portion 301, so as to connect the plate portion 301 and the hook portions 303. A front end of each hook portion 303 is embedded into a recess 111 of each buckling member 11 when the catching member 30 is located at the catching position, and exits from the recess 111 of each buckling member 11 when the catching member 30 is located at the releasing position. Each installing portion 304 is formed on a side of the plate portion 301 and faces the supporting member 221, in which a middle section of the first elastic member 31 is sleeved on each installing portion 304, so as to be disposed on a side of the catching member 30. The first elastic member 31 can be but is not limited to a torsion spring, with two ends respectively pressing against the plate portion 301 of the catching member 30 and the supporting members 221, so as to normally push the catching member 30 towards the catching position.

Figure 4:
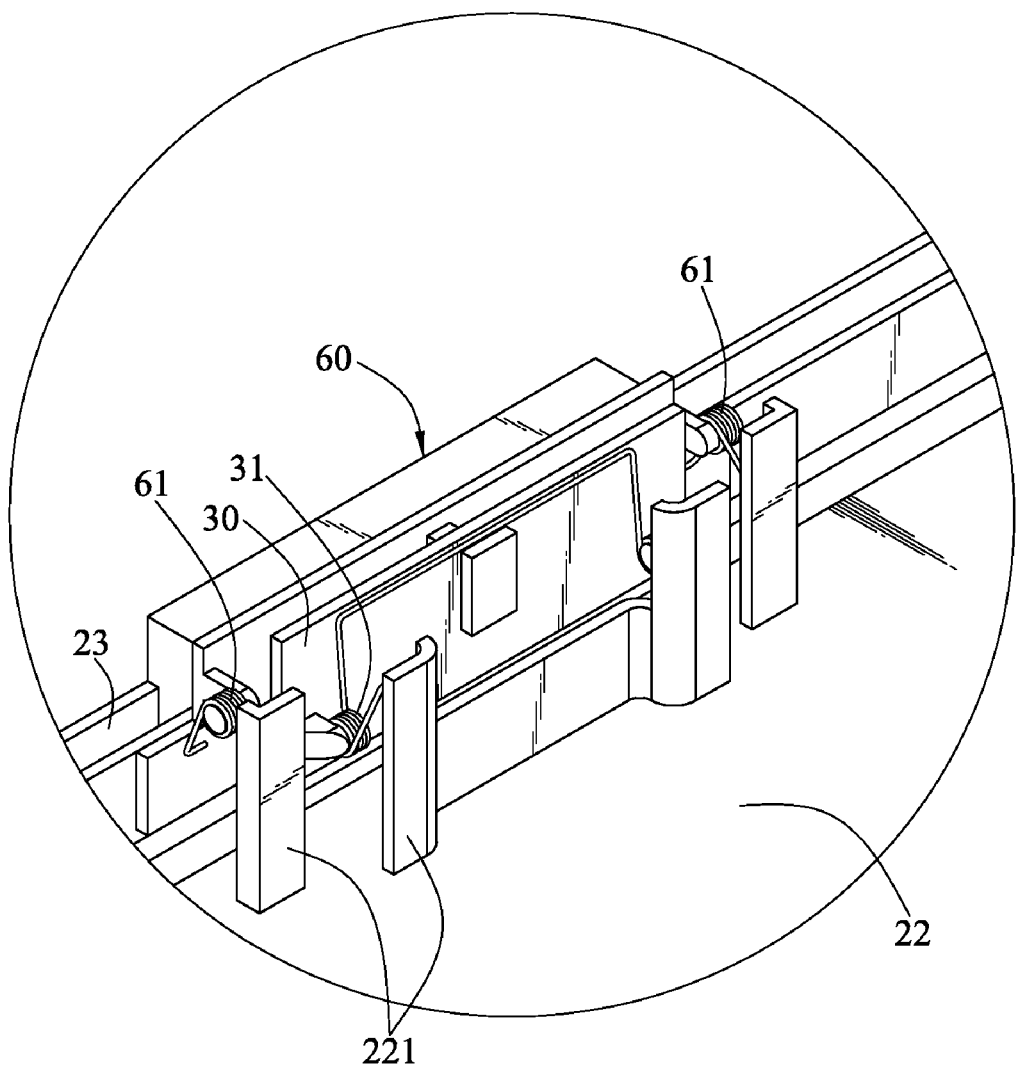
FIG. 4 is a partial schematic stereogram of the inner components of the second body in the present invention, in which the catching member is located in the catching position.

Referring to FIGS. 2A, 3A, and 4, the actuating member 60 is disposed on the side plate 23 of the second body 20, and is exposed the second body 20 by the notch 231 of the side plate 23. The actuating member 60 includes a stopping portion 601 and two installing portions 602. The actuating member 60 can be actuated (for example pressed) to move in the notch 231 of the side plate 23, so as to shift relative to the second body 20. A front end of the touching portion 601 presses against the middle section of the catching member 30, that is, the front end of the touching portion 601 presses against a side of the plate portion 301 back to the supporting member 221. The actuating member 60 is pressed into the second body 20, and pushes the catching member 30 with the touching portion 601 to move from the catching position to the releasing position. The middle section of each third elastic member 61 is sleeved on each installing portion 602 of the actuating member 60, so as to be disposed between the actuating member 60 and the supporting member 221. The third elastic member 61 can be but is not limited to a torsion spring, and two ends of the third elastic member 61 respectively press against the actuating member 60 and the supporting member 221. The third elastic member 61 is used to normally push the actuating member 60 towards the side plate 23, that is, to normally push the actuating member 60 out of the second body 20.

Referring to FIGS. 1A, 2A, 2B, and 3B, each limiting member 51 is respectively screwed on the bottom plate 22 of the second body 20 and corresponds to each through hole 211 of the top plate 21, in which each limiting member 51 has two guiding slots 511. Each ejecting member 50 is respectively installed in each limiting member 51, and is disposed on a side of the through hole 211, such that the limiting member 51 sleeves the ejecting member 50. Each ejecting member 50 has two bumps 51, and each bump 501 extends into each guiding slot 511 of the limiting member 51, such that the ejecting member 50 shifts along the guiding slot 511 in the limiting member 51. The ejecting member 50 is pushed to shift relative to the second body 20 between a retracting position and an ejecting position. Each limiting member 51 is disposed corresponding to the ejecting member 50, so as to limit the ejecting member 50 at the ejecting position when the second elastic member 52 pushes the ejecting member 50. The ejecting member 50 extends into the through hole 211 of the top plate 21 at the ejecting position, such that the top surface of the ejecting member 50 and the top surface of the top plate 21 are located on a same plane. The second elastic member 52 can be but is not limited to a compression spring, and it is installed in the limiting member 51 and is disposed corresponding to the ejecting member 50. Two ends of the second elastic member 52 press against the ejecting member 50 and the bottom late 22, so as to normally push the ejecting member 50 towards the ejecting position.

Figure 5:
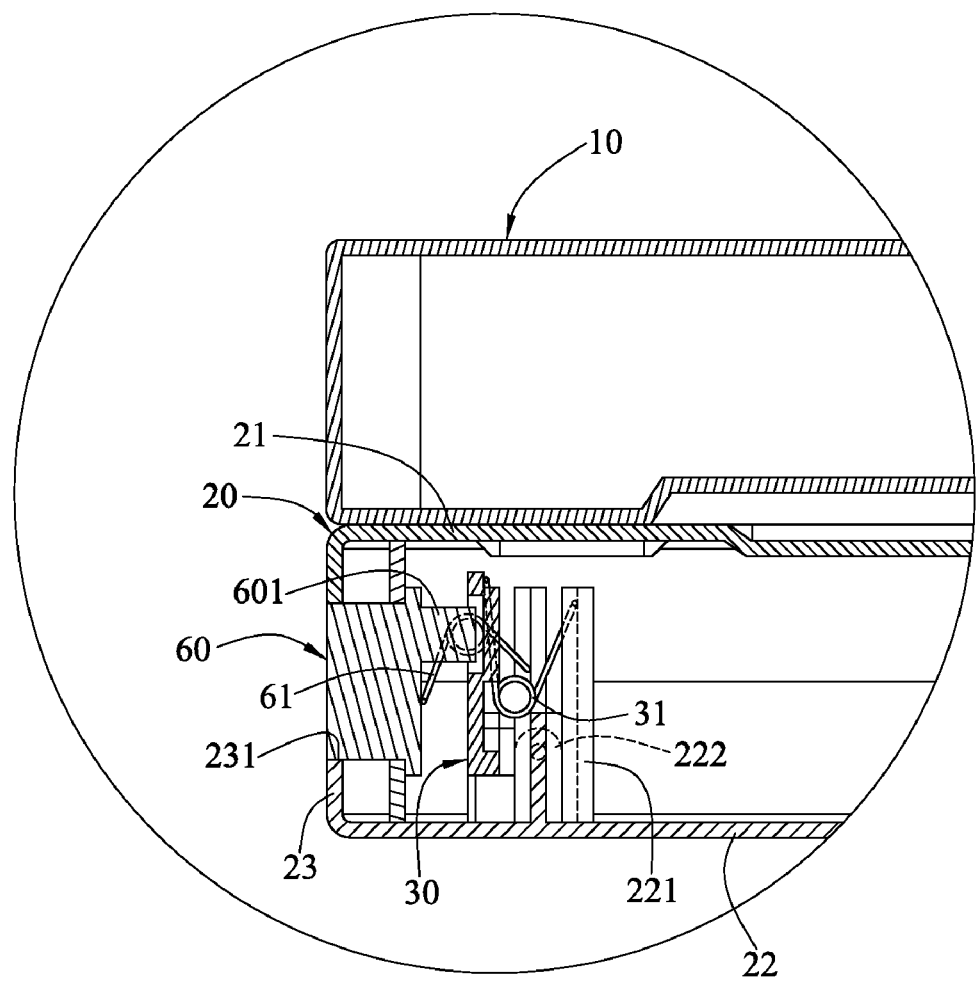
FIG. 5 is a partial schematic cross-sectional view of the closing of the first body and the second body in the present invention, in which the catching member is located in a catching position, and the ejecting member is located in a retracting position.
Figure 6:
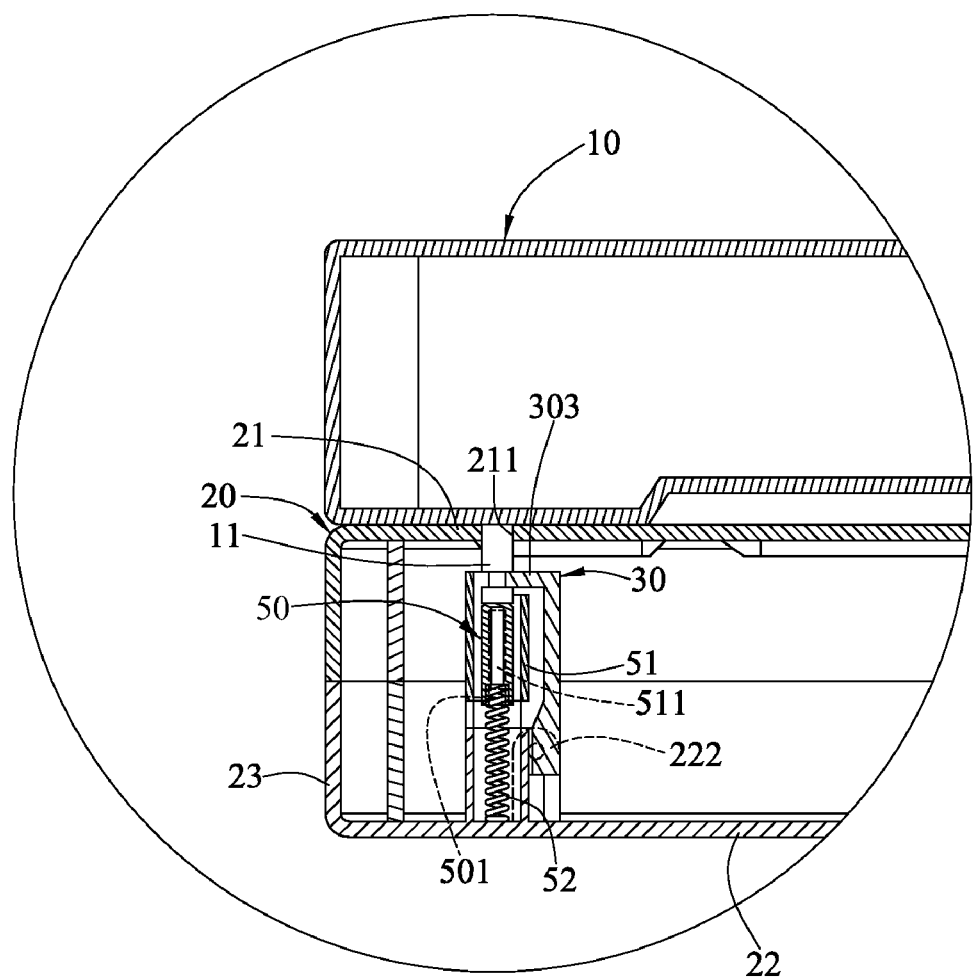
FIG. 6 is a partial schematic cross-sectional view of the closing of the first body and the second body in the present invention, in which the catching member is located in a catching position, and the ejecting member is located in a retracting position.

Referring to FIGS. 4, 5, and 6, when the first body 10 is closed on the second body 20 (that is the upper lid of the notebook computer is covered on the host), the buckling member 11 extends from the through hole 211 of the top plate 21 to the internal of the second body 20, and pushes the ejecting member 50 downward to the retracting position. At the same time, the first elastic member 31 also normally pushes the catching member 30 towards the catching position, such that the catching member 30 catches the buckling member 11 of the first body 10 by the hook portion 303. Therefore, when the first body 10 is closed on the second body 20, the catching member 30 automatically catches the buckling member 11, so as to fix the first body 10 on the second body 20.

Figure 7:
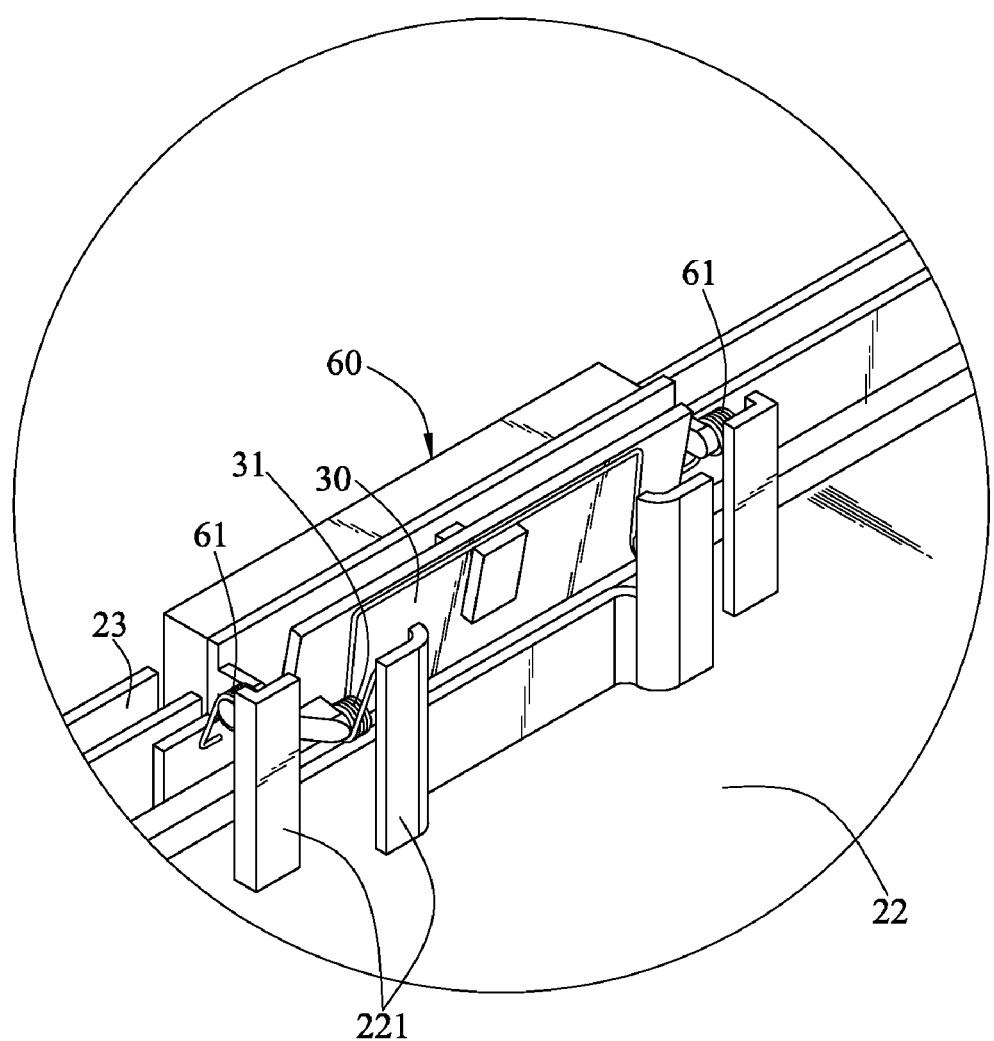
FIG. 7 is a partial schematic stereogram of the inner components of the second body in the present invention, in which the catching member is located in a releasing position.
Figure 8:
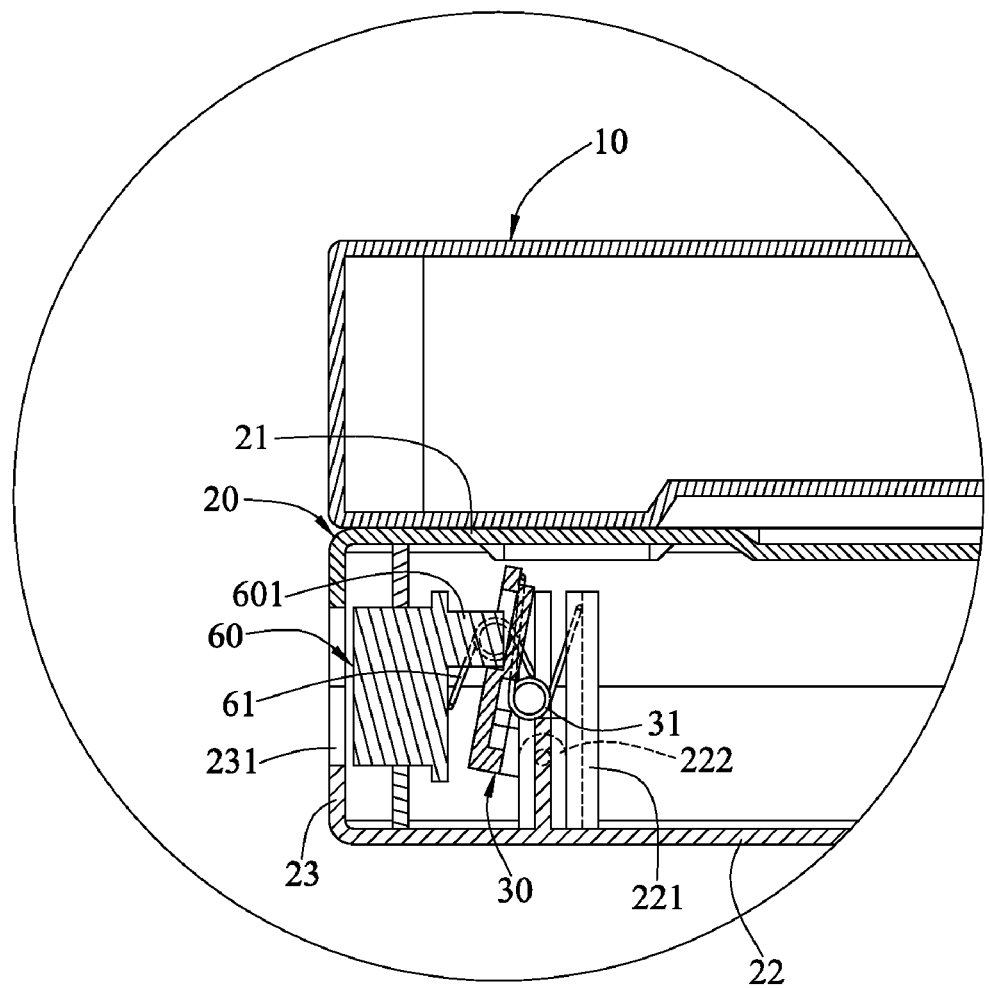
FIG. 8 is a partial schematic cross-sectional view of the closing of the first body and the second body in the present invention, in which the catching member is located in a releasing position, and the ejecting member is located in a retracting position.
Figure 9:
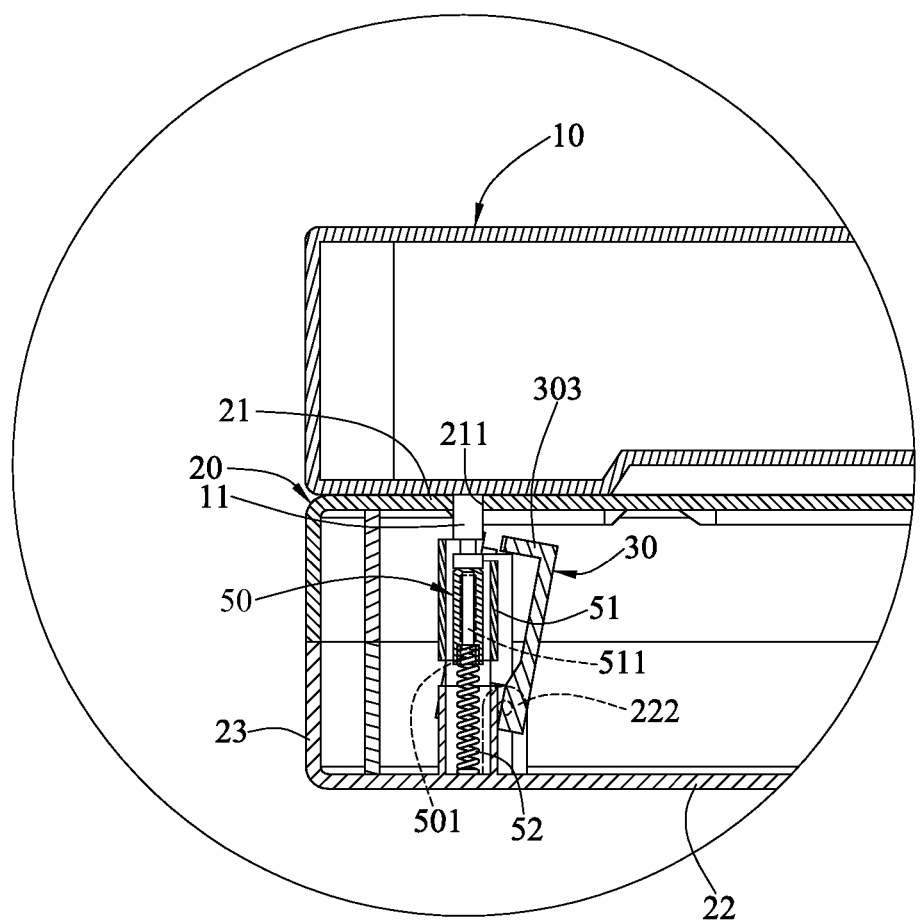
FIG. 9 is a partial schematic cross-sectional view of the closing of the first body and the second body in the present invention, in which the catching member is located in a releasing position, and the ejecting member is located in a retracting position.

Referring to FIGS. 7, 8, and 9, when the actuating member 60 is pushed into the second body 20, the touching portion 601 of the actuating member 60 pushes the catching member 30 towards the direction of the supporting member 221, such that the catching member 30 moves from the catching position to the releasing position. Therefore, the hook portion 303 of the catching member 30 releases the buckling member 11 of the first body 10 as well, that is, the front end of the hook portion 303 exits from the recess 111 of the buckling member 11, such that the first body 10 can be turned relative to the second body 20 (that is the upper lid of the notebook computer can be opened). At the same time, the ejecting member 50 is pushed by the second elastic member 52 towards the through hole 211, so as to push the buckling member 11 out of the through hole 211, such that a suitable gap is formed between the second body 20 and the first body 10, so as to prevent the catching member 30 from catching the buckling member 11 again after the actuating member 60 shifts back.

Figure 10:
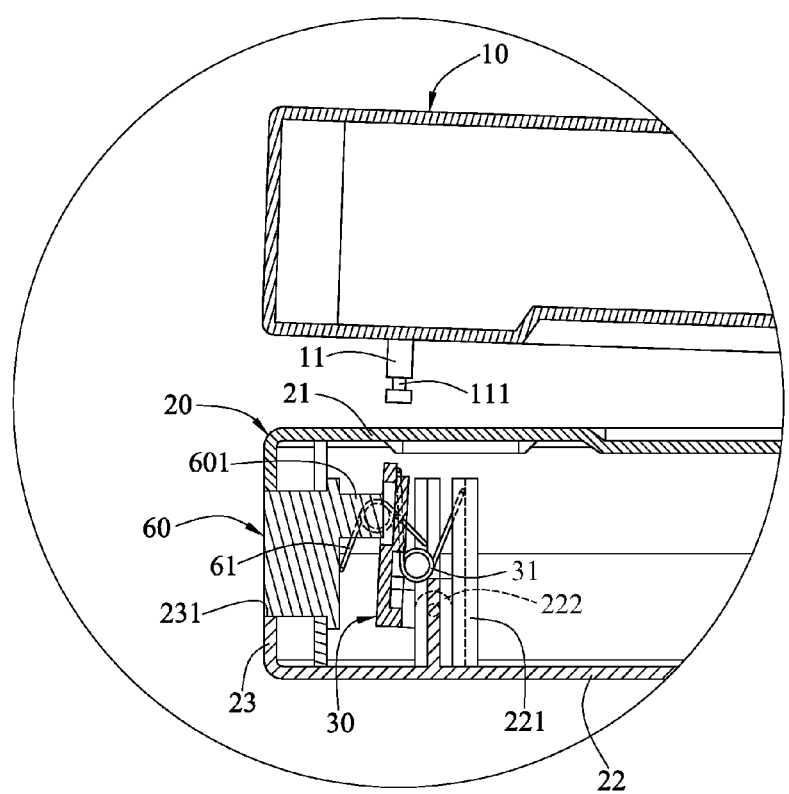
FIG. 10 is a partial schematic cross-sectional view of the closing of the first body and the second body in the present invention, in which the catching member presses against the ejecting member, and the ejecting member is located in an ejecting position.
Figure 11:
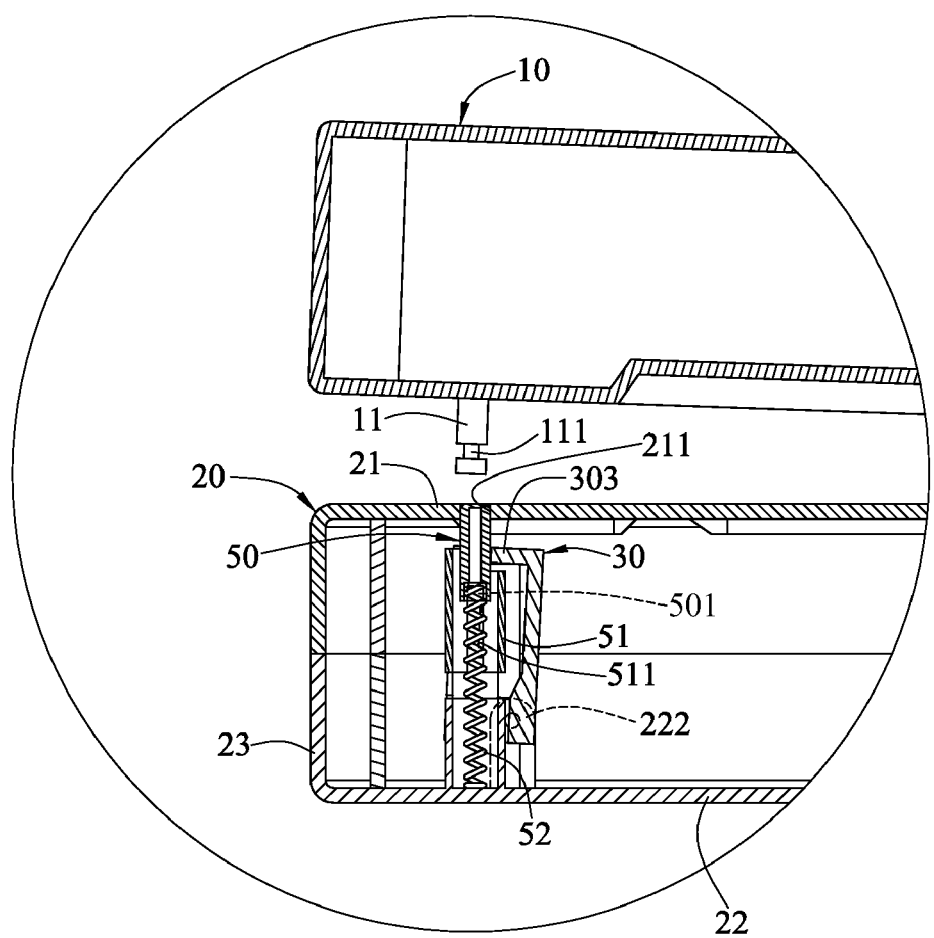
FIG. 11 is a partial schematic cross-sectional view of the closing of the first body and the second body in the present invention, in which the catching member presses against the ejecting member, and the ejecting member is located in an ejecting position.

Referring to FIGS. 10 and 11, when an external force of pushing the actuating member 60 disappears, the third elastic member 61 pushes the actuating member 60 out towards the second body 20 (i.e. pushes the actuating member 60 towards the direction of the side plate 23), such that the actuating member 60 returns to the original position exposing out of the second body 20. In the other aspect, when the first body 10 is opened from the second body 20, the second elastic member 52 pushes the ejecting member 50, such that the ejecting member 50 shifts from the retracting position to the ejecting position to extend into the through hole 211, the limiting member 51 is used to limit the shifting path of the ejecting member 50, such that the top surface of the ejecting member 50 and the top surface of the top plate 21 are located on a same plane.

The components for buckling the first body 10 (the upper lid of the notebook computer) in the present invention are installed on the second body 20 (the host of the notebook computer), so as to effectively prevent too much inner space of the first body 10 from being occupied, and to make the size of the upper lid of the notebook be finer. Next, the actuating member 60 can be pressed to make the catching member 30 release the buckling member 11, and to make the ejecting member 50 push the buckling member 11 out of the through hole 211, so it is helpful to open the first body 10 by pivoting. Further, the top surface of the ejecting member 50 is even with the surface of the through hole 211 when the first body is opened, so as to maintain the completeness of the surface of the second body 20. Not only the appearance of the host of the notebook computer is made to have more aesthetic sense, but also the extraneous material is prevented from entering into the through hole 211 to obstruct the closing of the upper lid.

What is claimed is:

1. An electronic device with switch module, comprising:
    a first body, having at least one buckling member; and
    a second body, pivoted to the first body to be closed together, wherein the second body has at least one through hole corresponding to the buckling member, so as to accommodate the buckling member when the first body is closed on the second body, and the second body comprises:
    a catching member, disposed in the second body and moving between a catching position and a releasing position, wherein when the first body is closed on the second body, the catching member catches the buckling member at the catching position;
    an actuating member, disposed on the second body, for pushing the catching member after being actuated, so as to move the catching member to the releasing position; and at least one ejecting member, disposed on a side of the through hole, shifting between a retracting position and an ejecting position after being pushed, wherein when the first body is closed on the second body, the ejecting member is pushed by the buckling member to the retracting position.

2. The electronic device with switch module as claimed in claim 1, wherein the catching member has at least one hook portion, and the buckling member has a recess, when the catching member is located at the catching position, a front end of the hook portion is embedded in the recess to catch the catching member.

3. The electronic device with switch module as claimed in claim 1, further comprising a first elastic member disposed on a side of the catching member and normally pushing the catching member towards the catching position.

4. The electronic device with switch module as claimed in claim 3, wherein the first elastic member is a torsion spring.

5. The electronic device with switch module as claimed in claim 1, further comprising at least one second elastic member disposed corresponding to the ejecting member and normally pushing the ejecting member towards the ejecting position.

6. The electronic device with switch module as claimed in claim 5, wherein the second elastic member is a compression spring.

7. The electronic device with switch module as claimed in claim 5, wherein the second body further comprises at least one limiting member disposed corresponding to the ejecting member and limiting the ejecting member at the ejecting position when the second elastic member pushes the ejecting member.

8. The electronic device with switch module as claimed in claim 7, wherein the limiting member has at least one guiding slot, and the ejecting member has at least one bump extending into the guiding slot, such that the ejecting member shifts between the retracting position and the ejecting position along the guiding slot.

9. The electronic device with switch module as claimed in claim 1, wherein the second body has a top plate facing the first body, a bottom plate facing the top plate, and a side plate connecting circumferences of the top plate and the bottom plate, and the through hole is disposed on the top plate.

10. The electronic device with switch module as claimed in claim 9, wherein the bottom plate has at least one supporting member facing the side plate, and two ends of the first elastic member respectively press against the catching member and the supporting member.

11. The electronic device with switch module as claimed in claim 9, further comprising a third elastic member disposed between the actuating member and the supporting member, wherein two ends of the third elastic member press against the actuating member and the supporting member and normally push the actuating member towards the side plate.

12. The electronic device with switch module as claimed in claim 11, wherein the third elastic member is a torsion spring.

13. The electronic device with switch module as claimed in claim 9, wherein the bottom plate has two bearing blocks facing each other, and two ends of the catching member are pivoted to the bearing blocks.

14. The electronic device with switch module as claimed in claim 9, wherein the ejecting member extends into the through hole at the ejecting position, such that a top surface of the ejecting member and a top surface of the top plate are located on a same plane.

15. The electronic device with switch module as claimed in claim 1, wherein the actuating member has at least one touching portion, and a front end of the touching portion presses against a middle section of the catching member.

* * * * *